June 16, 1959   J. C. REED, JR   2,891,246
BEACON SYSTEM
Filed Dec. 10, 1945
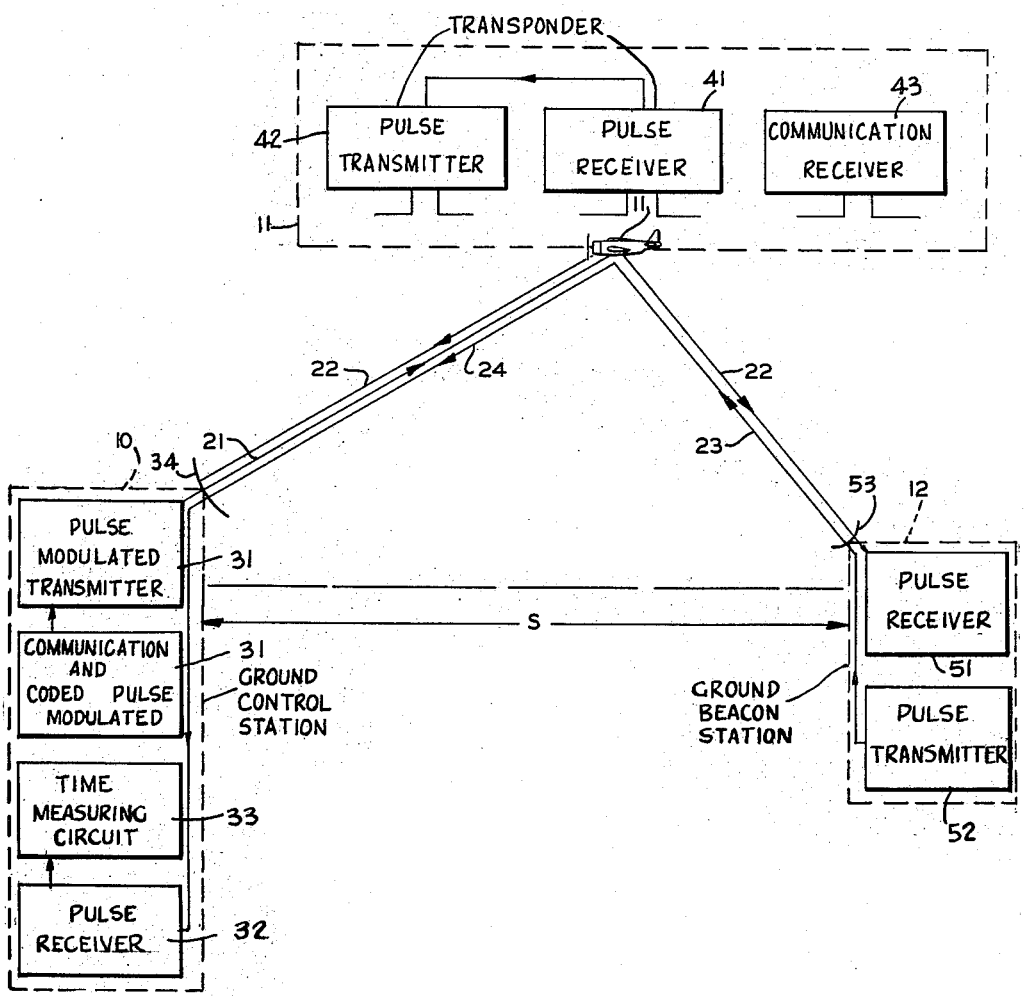
INVENTOR
JOHN C. REED JR.
BY
ATTORNEY 2,891,246
Patented June 16, 1959

2,891,246

BEACON SYSTEM

John C. Reed, Jr., Boston, Mass., assignor, by mesne assignments, to the United States of America as represented by the Secretary of the Navy Application December 10, 1945, Serial No. 634,119

8 Claims. (Cl. 343—15)

This invention relates to a ground control navigation system, and more particularly to a system adaptable for either long or short range ground control navigation of aircraft.

One of the usual methods of ground control navigation is to have the plane fly at a constant range from one ground station and to have a second ground station continually track said plane until a pre-determined range has been reached and then to transmit a signal which is received by the plane. However, this method requires that communications be accurately maintained between the two ground stations and the plane. Some other navigation systems require that the navigation be done by personnel in the plane, and other systems are limited as to useful operational range.

The primary object of this invention is to overcome the foregoing difficulties and limitations.

Another object of this invention is to provide a system for accurately determining the position of a ship, most importantly aircraft, by means of two ground stations separated from each other by a distance greater than "line of sight" distance.

Still another object of this invention is to provide a system for the long range navigation of a ship or aircraft by means of two ground stations, but with the communications being carried on only between the plane and one of the ground stations.

A further object of this invention is to provide a system for the navigation of an airplane by means of two ground stations, the plane's position, however, being determined from timing circuits located at one of the stations. In consequence, the other ground station may be substantially as simple as a beacon.

Still further objects will bcome apparent as the system is described in detail, by referring to the drawing in which the single figure is a block diagram of an embodiment of the invention.

Referring to the drawing, the system consists of a ground control station 10, a plane 11 containing a beacon or transpondor, and a ground beacon station 12, located at a fixed position at a distance S from the control station 10. A beacon or transpondor is generally defined as an electronic device which includes a transmitter and receiver and which automatically transmits a pulse signal in response to one received. The control station 10 transmits a pulse signal to the beacon located in the plane 11 and receives pulse signals from both the beacon in plane 11, and from the beacon station 12 via the beacon in plane 11.

In the specific case described here, the ground control station 10 comprises a transmitter 31, to be described later, capable of transmitting a coded pulse signal, a receiver 32 responsive to signal or triple pulse signals of the same frequency, and accurate set of timing circuits 33 for determining the plane's range and the time differential between two received pulse signals, and a directional antenna 34. This control station 10 will interrogate with a triple pulse signal, the time of occurrence of the third pulse being variable in time with respect to the first two. The three pulses trigger the beacon or transpondor including pulse receiver 41 and pulse transmitter 42 located in the plane 11, and, in addition, the third pulse carries the communication. The transpondor carried in plane 11 replies with the same type pulse signal (three pulses) with which it is interrogated, and the plane carried apparatus such as communication receiver 43 has been so designed or modified as to be responsive also to the third pulse of the pulse signal emanating from the control station 10 for communication purposes. This third pulse causes an audio oscillator circuit to be tuned on and off, thereby producing a tone in a set of headphones connected to the output of the audio oscillator circuit. This tone is broken at intervals so as to present dot dash code by varying the time relationship of the third pulse with respect to the first two.

The ground beacon station 12 located at a fixed position from control station 10 comprises a beacon or transpondor including pulse receiver 51 and pulse transmitter 52 of a type that will transmit a signal pulse signal when it is triggered by a triple pulse signal. This type of pulse coding permits the beacon station 12 to be controlled by ground control station 10. Therefore, several beacon stations might be used at different positions on the ground and each would be capable of independent control from the control station 10 by means of different interrogation codes. However, only one such beacon station is employed in the particular embodiment shown. Also, included at the beason station 12 may be an antenna 53 either non-directional or, as in this embodiment, directional. This directional antenna 53, however, requires the services of an operator for purposes of tracking the plane to be navigated.

The length of the baseline S may be of almost any value depending upon the power output of the equipment, but once established and the system calibrated this distance must not be changed. Because this system is not limited to "line of sight" range the distance between the two ground stations may be, for example, 60 miles or greater, rendering the system more flexible. In other words, longer range and more accurate navigation are possible. It is not necessary to know the actual value of the baseline S because the system is calibrated by observing the time differential between the two pulse signals received at control station 10 for several different positions of the plane 11 and plotting a chart of lines of position accordingly. During clear weather a plane, such as an observation plane, carrying the proper beacon or transpondor equipment, can fly over designated points calling for a fix from the control station over each point. Sufficient information is thus obtained for the charting of designated positions and for the calibrating of a map of a certain area. At any later time, at night or with overcast weather, the pilot of any other plane, properly equipped, can be navigated to a certain point with a high degree of accuracy.

In operation, navigation is accomplished by using "pulse relaying" so-called, with the beacon transpondor in the plane acting as the relay device. The ground control station 10 transmits a three pulse signal 21 on a certain chosen carrier frequency towards the plane 11 which triggers the beacon located in the plane. The third pulse of pulse signal 21, as previously described, furnishes one way communication to the plane. The beacon in the plane 11 is adapted to reply with the same type signal with which it is interrogated and therefore transmits the second pulse signal 22 also consisting of three pulses, but on a different carrier frequency from that of the initial pulse signal 21. This second pulse signal 22 is received by a receiver 32 located at the ground control station 10 responsive to such a pulse signal, and also by the beacon station 51 whose transmitter 52 then transmits a single pulse signal 23. The third pulse signal 23 may be on a carrier having the same frequency as the initial pulse signal 21, and is preferably directed toward the plane 11 by means of a directional antenna 53. The beacon in plane 11 is now triggered, producing a fourth pulse signal 24 consisting of a single pulse on the same carrier frequency as the second pulse signal 22. This fourth pulse signal 24 is received by the receiver 32 at the control station 10, and there by the use of accurate timing circuits 33 the time difference between the receipt of the second and fourth pulse signals 22 and 24 respectively, is measured. This information, together with the time range of the plane 11 from control station 10 obviously obtainable from the time of receipt of pulse signal 22, offers sufficient information to accurately locate the position of the plane.

It is believed that the design and operation of the improved ground control navigation system, as well as the advantages thereof, will be apparent from the foregoing description thereof. It will also be apparent that while the invention has been shown and described in a preferred form, changes may be made without departing from the invention, as sought to be defined in the following claims.

What is claimed is:

1. A long range ground control radio navigation system for an airplane, said system comprising a fixed ground control station, a fixed ground beacon station capable of replying with a pulse signal of a different type from its triggering pulse signal and spaced from said ground control station at a distance greater than that possible with line of sight operation, and a beacon in said plane capable of replying with the same type pulse signal that is received, said ground control station transmitting a first coded pulse signal of a first frequency including three pulses, said first coded pulse signal being directed toward said plane for triggering the beacon therein, said beacon in said plane responding to the reception of said first coded pulse signal to produce a second coded pulse signal of a second frequency and also consisting of three pulses, said second coded pulse signal being received by said ground control station and also being received by said ground beacon station, said beacon at said ground station responding to said second coded pulse signal at said second frequency and causing the transmission therefrom toward said plane of a third pulse signal of said first frequency and consisting of a single pulse for triggering the beacon in said plane, said beacon on said plane responding to a single pulse of said first frequency for producing a fourth pulse signal of the single pulse type and of the same frequency as said second coded pulse signal, said fourth pulse signal being received by said ground control station, and means at said ground control station for determining the time differential between the arrival times of said second and said fourth pulse signals received thereat in respect to the time of transmission of the said first pulse signal, thereby locating the position of said plane.

2. A radio pulse system for the navigation of mobile craft comprising, a ground control station radiating a series of signal pulses of a first radio frequency in a predetermined coded sequence, a mobile beacon station carried on said craft, said mobile beacon station operating to radiate a reply pulse of a second radio frequency in response to each signal pulse of said first radio frequency received thereat, a fixed ground beacon station spaced from said ground control station, said fixed beacon station operating to radiate a single reply pulse of said first radio frequency toward said craft in response to a series of pulses of said second radio frequency received thereat in said predetermined coded sequence, and means at said ground control station responsive to reply pulses received thereat directly from said craft and relayed by said craft from said ground beacon station to indicate the position of said craft.

3. A radio pulse system for the navigation of mobile craft comprising, a ground control station radiating a series of signal pulses of a first radio frequency energy in a predetermined coded sequence, a mobile beacon station carried on said craft, said mobile beacon station radiating a single reply pulse of a second radio frequency in response to each signal pulse of said first radio frequency received thereat, a fixed ground beacon station spaced from said ground control station, said fixed beacon station radiating a single reply pulse of said first radio frequency toward said craft in response to a series of pulses of said second radio frequency received thereat in said predetermined coded sequence, and means at said ground control station for indicating the difference in arrival time of a coded series of reply pulses of said second radio frequency radiated from said craft and a single reply pulse of said second radio frequency radiated by said craft in response to said fixed beacon station single reply pulse of said first radio frequency to indicate the position of said craft.

4. A radio pulse system for the navigation of mobile craft comprising a ground control station radiating a series of signal pulses of radio frequency energy at a first frequency in a predetermined coded sequence toward said craft, a mobile beacon station carried on said craft, said mobile beacon station radiating a single reply pulse at a second frequency in response to each signal pulse of said first frequency received thereat, a fixed ground beacon station spaced from said ground control station, said fixed beacon station radiating a single reply pulse at said first frequency toward said craft in response to a series of pulses of said second frequency received thereat in said predetermined coded sequence, and means at said ground control station responsive to said coded series reply pulses at said second frequency received directly from said craft and said single reply pulses at said second frequency relayed by said craft from said fixed ground beacon station to determine the difference in arrival time at said ground control station as an indication of the position of said craft.

5. A radio pulse system for the navigation of mobile craft comprising a ground control station radiating a series of signal pulses of radio frequency energy at a first frequency in a predetermined coded sequence toward said craft, a mobile beacon station carried on said craft, said mobile beacon station radiating a series of reply pulses in said coded sequence at a second frequency in reception to each coded series of signal pulses at said first frequency received thereat and radiating a single reply pulse as said second frequency in response to each single pulse of said first frequency received thereat, a fixed ground beacon station spaced from said ground control station at a distance greater than that possible with line of sight operation, said fixed beacon station radiating a single reply pulse at said first frequency in response to a series of pulses of said second frequency received thereat in said predetermined coded sequence, and means at said ground control station responsive to said coded series reply pulses at said second frequency received thereat directly from said craft and said single reply pulses at said second frequency relayed by said craft from said ground beacon station to determine the difference in arrival time thereof at said ground control station as an indication of the position of said craft.

6. A long range ground control radio navigation system for a ship, said system comprising a fixed ground control station, a fixed ground beacon station spaced from said ground control station and a beacon in said ship, said ground control station having means for transmitting a first coded sequence of pulses of a first radio frequency toward said ship for triggering the beacon therein, said beacon being responsive to said first coded sequence of pulses to produce a second coded sequence of pulses of a second radio frequency, said second coded sequence of pulses being received by said ground control station and also by said ground beacon station, said fixed ground beacon station being responsive to said second coded sequence of pulses to cause the transmission of a third coded sequence of pulses of said first radio frequency from said ground beacon station towards said ship, said third coded sequence of pulses being received by the beacon in said ship and producing a fourth coded sequence of pulses of said second radio frequency which is received by said ground control station and receiving means at said ground control station for determining the time differential between the arrival times of said second coded sequence of pulses and said fourth coded sequence of pulses received thereat with respect to the time of transmission of said first coded sequence of pulses, thereby to locate the position of said ship.

7. A system for measuring at a base point the distance between two remote points comprising, in combination, a master station located at said base point and a repeater station located at each of said remote points; each station including a transmitter and a receiver, means at each of said repeater stations connecting the transmitter and receiver to effect reradiation by the transmitter of signals arriving at the receiver; the transmitter at said master station, the receiver at the first of said repeater stations, and the transmitter at the second of said repeater stations being tuned to a first frequency; the receiver at said master station, the transmitter at the first of said repeater stations and the receiver at the second of said repeater stations being tuned to a second frequency; whereby signals transmitted from said master station are initially received only at the first of said repeater stations, signals reradiated from the second of said repeater stations are initially received only at the first of said repeater stations, and signals reradiated from the first of said repeater stations are received at both said master station and the second of said repeater stations; so that signals transmitted from said master station are returned directly to said master station from the first of said repeater stations, and are concurrently reradiated to the second of said repeater stations, returned to the first of said repeater stations and thence to said master station; and means at said master station for measuring the lapsed time between the arrival at said master station of signals returned directly from the first of said repeater stations and of signals returned from the second of said repeater stations through the first of said repeater stations to said master station.

8. A system for measuring at a base point the distance between two remote points comprising, in combination, a master station located at said base point and a repeater station located at each of said remote points; each station including a transmitter and a receiver; means at each of said repeater stations connecting the transmitter and receiver to effect reradiation by the transmitter of signals arriving at the receiver; means for receiving signals from said master station only at the first of said repeater stations, means receiving at the first of said repeater stations only signals reradiated from the second of said repeater stations, and means receiving at both said master station and the second of said repeater station signals reradiated from the first of said repeater stations; so that signals transmitted from said master station are returned directly to said master station from the first of said repeater stations, and are concurrently reradiated to the second of said repeater stations, returned to the first of said repeater stations and thence to said master station; and means at said master station for measuring the lapsed time between the initial arrival at said master station of signals returned directly from the first of said repeater stations and the later arrival of signals returned from the second of said repeater stations through the first of said repeater stations to said master station.

References Cited in the file of this patent

UNITED STATES PATENTS

| | | |
|---|---|---|
| 2,301,929 | Budenbom | Nov. 17, 1942 |
| 2,403,600 | Holmes | July 9, 1946 |
| 2,406,953 | Lewis | Sept. 3, 1946 |
| 2,408,048 | Deloraine | Sept. 24, 1946 |
| 2,419,525 | Alford | Apr. 29, 1947 |
| 2,420,408 | Behn | May 13, 1947 |
| 2,449,977 | Busignies | Sept. 28, 1948 |
| 2,453,970 | Charrier | Nov. 16, 1948 |
| 2,459,811 | Grieg | Jan. 25, 1949 |
| 2,471,373 | Joyner | May 24, 1949 |
| 2,535,038 | Busignies | Dec. 26, 1950 |
| 2,535,048 | Deloraine | Dec. 26, 1950 |
| 2,537,102 | Stokes | Jan. 9, 1951 |
| 2,746,034 | Hasbrook | May 15, 1956 |